(12) United States Patent
Xing et al.

(10) Patent No.: US 12,238,107 B2
(45) Date of Patent: Feb. 25, 2025

(54) ACCESS CONTROL METHOD, DEVICE, APPARATUS AND READABLE STORAGE MEDIUM

(71) Applicant: SUZHOU METABRAIN INTELLIGENT TECHNOLOGY CO., LTD., Jiangsu (CN)

(72) Inventors: Xishuang Xing, Jiangsu (CN); Guixiang Song, Jiangsu (CN)

(73) Assignee: SUZHOU METABRAIN INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/563,713

(22) PCT Filed: Feb. 25, 2022

(86) PCT No.: PCT/CN2022/078099
§ 371 (c)(1),
(2) Date: Nov. 22, 2023

(87) PCT Pub. No.: WO2023/056727
PCT Pub. Date: Apr. 13, 2023

(65) Prior Publication Data
US 2024/0305642 A1 Sep. 12, 2024

(30) Foreign Application Priority Data
Oct. 8, 2021 (CN) .......................... 202111168143.X

(51) Int. Cl.
*H04L 9/40* (2022.01)
(52) U.S. Cl.
CPC .................. *H04L 63/101* (2013.01)
(58) Field of Classification Search
CPC .................................................... H04L 63/101
See application file for complete search history.

(56) References Cited

U.S. PATENT DOCUMENTS

| | | | | |
|---|---|---|---|---|
| 6,105,132 A | * | 8/2000 | Fritch ................. | G06F 21/6218 713/168 |
| 6,279,111 B1 | * | 8/2001 | Jensenworth ....... | G06F 21/6218 713/172 |

(Continued)

FOREIGN PATENT DOCUMENTS

| | | |
|---|---|---|
| CN | 101729403 A | 6/2010 |
| CN | 104094618 A | 10/2014 |

(Continued)

OTHER PUBLICATIONS

Zhang, Dao-Yin. "Research on hybrid access control policy and its application." Computer Engineering and Design 30.15 (2009): 3514-3516.

(Continued)

*Primary Examiner* — Yonas A Bayou
(74) *Attorney, Agent, or Firm* — IPro, PLLC

(57) ABSTRACT

The present application provides an access control method, device, apparatus, and readable storage medium. The method comprises: receiving and parsing an access request, and determining a subject and an object corresponding to the access request; by using a security access strategy, obtaining a first result of whether the subject has permission to access the object, and determining whether a match access control linked list exists; when the access control linked list exists, by using the access control linked list, obtaining a second result whether the subject has permission to access the object; when the second result is obtained, by using the second result, performing control processing on the access request; or when the second result is not obtained, by using the first result, performing control processing on the access request.

13 Claims, 5 Drawing Sheets

(56) References Cited

U.S. PATENT DOCUMENTS

| | | | |
|---|---|---|---|
| 8,468,579 B2* | 6/2013 | Ellison | H04L 63/101 |
| | | | 713/184 |
| 8,826,390 B1* | 9/2014 | Varda | G06F 21/6218 |
| | | | 726/4 |
| 9,253,195 B2* | 2/2016 | Ellison | H04L 63/101 |
| 10,044,718 B2* | 8/2018 | Burrows | H04L 63/101 |
| 2011/0222099 A1* | 9/2011 | Mori | G06F 3/1219 |
| | | | 358/1.14 |
| 2011/0321117 A1 | 12/2011 | Nestler et al. | |
| 2012/0151554 A1 | 6/2012 | Tie et al. | |
| 2017/0063862 A1* | 3/2017 | Guo | G06F 21/31 |
| 2019/0253427 A1* | 8/2019 | Kling | G06F 3/0622 |
| 2022/0159004 A1* | 5/2022 | De Santis | H04L 63/101 |

FOREIGN PATENT DOCUMENTS

| | | | |
|---|---|---|---|
| CN | 104484617 A | 4/2015 | |
| CN | 105959322 A | 9/2016 | |
| CN | 108614969 A | 10/2018 | |
| CN | 109460673 A | 3/2019 | |
| CN | 109992983 A | 7/2019 | |
| CN | 109995738 A | 7/2019 | |
| CN | 112733165 A | 4/2021 | |
| CN | 113612802 A | 11/2021 | |
| EP | 1084464 A1 * | 3/2001 | G06F 21/335 |
| EP | 697662 B1 * | 5/2001 | G06F 21/604 |
| EP | 2973184 A1 * | 1/2016 | G06F 21/57 |
| EP | 3509004 A1 | 7/2019 | |
| EP | 3699799 A1 * | 8/2020 | G06F 21/604 |
| WO | 2020169555 A1 | 8/2020 | |

OTHER PUBLICATIONS

Hwang, JeeHyun, et al. "ACPT: A tool for modeling and verifying access control policies." 2010 IEEE International Symposium on Policies for Distributed Systems and Networks. IEEE, 2010.

Zhen Liu. "Research on access control technology of associated data." Information Theory and Practice 37.12 (2014): 127-132.

Wang, Yu-Ding, et al. "Survey on access control technologies for cloud computing." Journal of Software 26.5 (2015): 1129-1150.

Fang, Liang, et al. "A survey of key technologies in attribute-based access control scheme." Chinese Journal of Computers 40.7 (2017): 1680-1698.

* cited by examiner

ACCESS CONTROL METHOD, DEVICE, APPARATUS AND READABLE STORAGE MEDIUM

CROSS-REFERENCE TO RELATED APPLICATION

This application claims priority to and benefits of Chinese Patent Application Serial No. CN202111168143.X, and the title of "access control method, device, apparatus and readable storage medium" filed with the State Intellectual Property Office of P. R. China on Oct. 8, 2021, the entire content of which is incorporated herein by reference.

FIELD

The present application relates to the technical field of security assurance and, more particularly, to an access control method, device, apparatus and readable storage medium.

BACKGROUND

The security objective of an information system is to control and manage the access of a subject to an object by means of a set of rules. These access control rules are referred to security strategies, which reflect the security requirements of a data system. A security model is the basis of making the security strategy. The security model refers to a formal method to accurately describe important aspects of security (confidentiality, integrity and availability) and their relationship with a system behavior. An access control model describes the security system from the perspective of access control, mainly aiming at the access of the subject to the object in the system and its security control. A security model of access control generally includes a subject, an object and a permission. Generally, the access control may be classified into Discretionary Access Control (DAC) and Mandatory Access Control (MAC).

The discretionary access control mechanism allows the owner of an object to formulate a protection strategy for the object. The discretionary access control mechanism is often used in commercial systems due to its ease of use and scalability. However, a maximum problem of discretionary access control is that the permission of the subject is too large, data may be leaked inadvertently, and it may not defend against the attack of Trojan horse. The mandatory access control may defend the Trojan horse and prevent a user from abusing permission, and has higher security, but it is difficult to change an access strategy and has poor flexibility. That is, both the discretionary access control and the mandatory access control are difficult to satisfy the actual control requirements.

SUMMARY

An embodiment of present application provides a access control method, including:
  receiving and parsing an access request, and determining a subject and an object corresponding to the access request;
  by using a security access strategy, obtaining a first result whether the subject has a permission to access the object, and determining whether a match access control linked list exists;
  when the access control linked list exists, by using the access control linked list, obtaining a second result whether the subject has a permission to access the object; and
  when the second result is obtained, by using the second result, performing control processing on the access request, or when the second result is not obtained, by using the first result, performing control processing on the access request.

According to some embodiments, when the access control linked list is an attribute access control linked list, the step of, by using the access control linked list, obtaining the second result whether the subject has the permission to access the object, including:
  obtaining an attribute of the subject and the object; and
  querying the second result matching the attribute from the attribute access control linked list.

According to some embodiments, wherein when the access control linked list is a scenario access control linked list, the step of, by using the access control linked list, obtaining the second result whether the subject has the permission to access the object, including:
  acquiring scenario information corresponding to the access request; and
  querying the second result matching the scenario information from the scenario access control linked list.

According to some embodiments, the access control method further includes:
  receiving a modification request of the access control linked list to obtain modification content; and
  by using the modification content, modifying the access control linked list.

According to some embodiments, the access control method further includes:
  receiving a viewing request of the access control linked list; and
  outputting the access control linked list.

According to some embodiments, when the security access strategy is a discretionary access strategy, the step of, by using the security access strategy, obtaining the first result whether the subject has the permission to access the object, including:
  obtaining an authorization list corresponding to the object; and
  searching the subject in the authorization list to obtain the first result whether the subject has the permission to access the object.

According to some embodiments, when the security access strategy is a mandatory access strategy, the step of, by using the security access strategy, obtaining a first result whether the subject has the permission to access the object, includes:
  obtaining a security tag of the subject and a security tag of the object; and
  comparing the security tag of the subject with the security tag of the object to obtain the first result whether the subject has the permission to access the object.

An embodiment of present application further provides a access control device, including:
  a request receiving module, configured for receiving and parsing an access request, and determining a subject and an object corresponding to the access request;
  a first result determination module, configured for by using a security access strategy, obtaining a first result whether the subject has a permission to access the object, and determining whether a match access control linked list exists;

a second result determination module, configured for when the access control linked list exists, by using the access control linked list, obtaining a second result whether the subject has a permission to access the object;

a first access control module, configured for when the second result is obtained, by using the second result, performing control processing on the access request; and a second access control module, configured for when the second result is not obtained, by using the first result, performing control processing on the access request.

An embodiment of present application further provides an electronic device, including:

a memory, configured for storing computer-readable instructions;

a processor, configured for implementing the step of the method according to any one of the embodiments above-mentioned when executing the computer-readable instruction.

An embodiment of present application further provides One or more non-transitory computer-readable storage media storing computer-readable instructions, wherein when the computer-readable instruction is executed by one or more processors, making the one or more processors perform the step of the method according to any one of the embodiments above-mentioned.

BRIEF DESCRIPTION OF THE DRAWINGS

In order to illustrate the embodiments of the present application or the technical solutions in the related art more clearly, the drawings that are needed in the description of the specific embodiments or the related art will be briefly introduced below. Apparently, the drawings in the following description are merely some embodiments of the present application, and other drawings may be obtained according to these drawings without creative work for a person skilled in the art.

DETAILED DESCRIPTION

In order to make a person skilled in the art better understand the solution of the embodiment of the present application, the present application will be further explained in detail with the drawings and particular embodiments below. Apparently, the described embodiments are merely a portion of the embodiments of the present application, but not all the embodiments. Based on the embodiments in the present application, all other embodiments obtained by a person skilled in the art without creative efforts shall fall within the protection scope of the present application.

Figure 1:
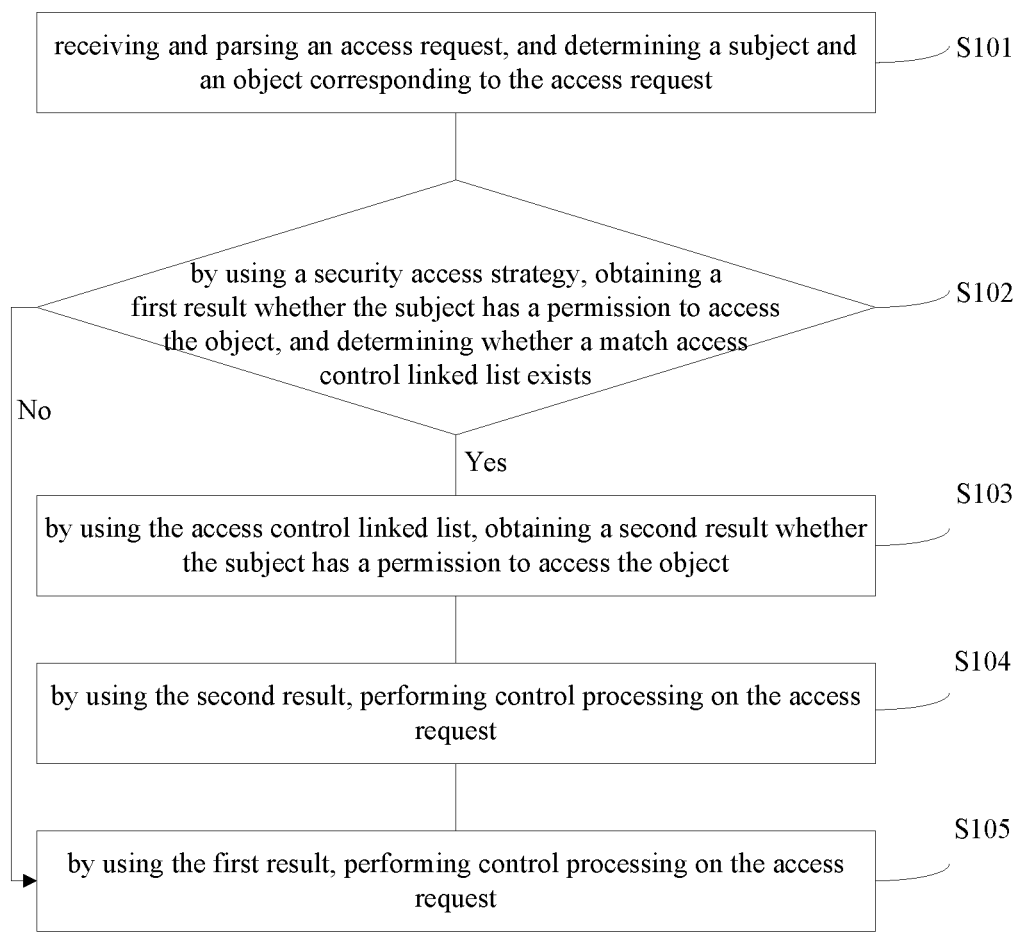
FIG. 1 is an implementation flow chart of the method for controlling the access according to one or more embodiments.

Please refer to FIG. 1, which shows a flowchart of the access control method provides by an embodiment of the present application, this method may include following steps:

S101, receiving and parsing an access request, and determining a subject and an object corresponding to the access request.

After receiving the access request, the access request may be parsed to determine the subject and the object corresponding to the access request.

Wherein, the subject may be a process or a thread, and the object (that is the access object) may be a file, a directory, a Transmission Control Protocol (TCP)/User Datagram Protocol (UDP) port, a shared memory segment, an input/output (I/O) device, a table, a view, a process, and the like.

S102, by using a security access strategy, obtaining a first result whether the subject has a permission to access the object, and determining whether a match access control linked list exists.

Generally, the security access strategies include a discretionary access control strategy and a mandatory access control strategy. In the embodiment of the present application, the security access strategy may be a discretionary access control strategy or a mandatory access control strategy. The following describes in detail how to obtain the first result by taking different security access strategies as examples.

When the security access strategy is a discretionary access strategy, the step of S102, by using the security access strategy, obtaining the first result whether the subject has the permission to access the object, including:

Step 1, obtaining an authorization list corresponding to the object.

Step 2, searching the subject in the authorization list to obtain the first result whether the subject has the permission to access the object.

For the convenience of description, the above-mentioned two steps will be described in combination.

The discretionary access control mechanism allows the owner of an object to formulate a protection strategy for this object. Generally, the DAC defines which subjects may perform what operations for which objects by means of an authorization list. That is, after the subject and the object are determined, the authorization list set by the owner of the object may be obtained first. After obtaining the authorization list of the object, the subject may be looked up in the authorization list, and determining whether the subject has the permission to access the object from the corresponding permission setting. In other words, the first result may be that the subject has the permission to access the object, or that the subject does not have the permission to access the object.

In some embodiments, the method for controlling the access includes: when the security access strategy is the discretionary access strategy, executing step S102. In response to the security access strategy being a discretionary access strategy, executing step S102.

When the security access strategy is a mandatory access strategy, the step of 102, by using the security access strategy, obtaining a first result whether the subject has the permission to access the object, includes:

Step 1, obtaining a security tag of the subject and a security tag of the object; and Step 2, comparing the security tag of the subject with the security tag of the object to obtain the first result whether the subject has the permission to access the object.

For the convenience of description, the above-mentioned two steps will be described in combination.

The mandatory access control identifies two security tags for the access subject and the object (that is the control object), one is a security level label tag having a partial order relationship, and the other is a non-level classification tag. By comparing the security tags of the subject and the object, it is determined whether one subject is capable to access a certain object. That is, the subject and the object each have a set of security tags. Every time the subject attempts to access the object, an authorization rule is enforced by the system-checking the security tag and deciding whether the subject is capable to perform access. Any operation of any subject on any object will be tested according to a set of authorization rules (also referred to strategies) to decide whether the operation is allowed or not.

In some embodiments, the method for controlling the access includes: executing step S102 when the security access strategy is a mandatory access strategy. In response to the security access strategy being a mandatory access strategy, executing step S102.

In order to improve the security and flexibility of the security access strategy, an access control linked list may be set according to the actual requirements. That is, in this access control linked list, an access control rule that may not be set or adjusted by the original discretionary access control or mandatory access control may be set. When the first result is determined based on the security access strategy, it may be further clarified whether the match access control linked list exists. If the access control list does not exist, directly jumping to step S105, and when the access control linked list exists, executing step S103.

S103, by using the access control linked list, obtaining a second result whether the subject has a permission to access the object.

The access control linked list may be an access rule that incapable to be set by the security access strategy. That is, based on the access control linked list, confirming whether the subject has the permission to access the object. It should be noted that, the second result and the first result may be related or different, and for the same access request, merely the first result may exist without the second result. The merely difference between the first and the second is that the reference basis for determining whether the subject has the permission to access the object is different.

The access control linked list includes an attribute access control linked list and a scenario access control linked list. The implementation process of determining the second result corresponding to different access control linked lists is as follows:

A first way: when the access control linked list is an attribute access control linked list, the step of S103, by using the access control linked list, obtaining the second result whether the subject has the permission to access the object, including:

Step 1, obtaining an attribute of the subject and the object.

Step 2, querying the second result matching the attribute from the attribute access control linked list.

That is, access permissions between attributes are set in the attribute access control linked list. In this way, it may be determined whether the subject has the permission access the object based on the attribute.

The attribute rules of the subject or the object may be configured in the attribute access control linked list. The attributes of the subject are the features of the subject, for example, the access process is a system process, the parent process ID of the access process is 1234, and the like. The attributes of the object are the features of the object, for example, the accessed file is a system file, and the owner of the accessed file is root and the like. The subject attribute and the object attribute may be obtained dynamically by an access control implementation program. By configuring the attribute rule in the attribute access control linked list, the access of the subject to the object may be controlled more fine granularity by means of the attribute judgment.

First example: Some important system file B, in which sensitive service data are stored, the attribute is set to be confidential, and merely a program operating under an account A is allowed to access it, and sensitive data leakage is avoided. When the sensitive service data in the B file are deleted by the account A or judged by the account A that it is no longer necessary to keep confidential, that is, the system file B no longer contains sensitive data, the account A may change the attribute of the file B from confidential to ordinary, and the system file B may automatically allow accounts other than the account A to access.

Second Example: The service system automatically archives some files, and the attribute of the archived files is set as archive in the attribute access control linked list, and the archived files are not allowed to be modified by any program. The archived document generally has an archiving validity period (for example, one year), after one year, it no longer has archiving value, and its attribute become non-archived. A non-archived document is allowed to be modified by a relevant program.

In some embodiments, the process of the first way may include: when the access control linked list is an attribute access control list, executing step S103. Certainly, step S103 may also be executed in response to the access control linked list being an attribute access control linked list.

A second way: when the access control linked list is a scenario access control linked list, the step of 103, by using the access control linked list, obtaining the second result whether the subject has the permission to access the object, including:

Step 1, acquiring scenario information corresponding to the access request.

Step 2, querying the second result matching the scenario information from the scenario access control linked list.

That is, the access permission of the subject and the object in different scenarios may be set in the scenario access control linked list. In this way, when a specific scenario is satisfied, it may be determined whether the subject is capable to access the object.

A scenario rule may be configured in the scenario access control linked list. The scenarios are global variables that transcend the subject and the object, for example, a system time when an access operation occurs, a system operation mode when an access operation occurs, and various specific service scenarios when an access operation occurs, and the like. By configuring the scenario rule in the scenario access control list, the access of the subject to the object may be controlled more fine granularity by means of a scenario constraint.

In some embodiments, the process of the second way may include: when the access control linked list is a scenario access control linked list, executing the step of S103. Certainly, step S103 may also be executed in response to the access control linked list being a scenario access control linked list.

A first example: The service system is generally provided with a debugging account. Important system resources are not allowed to be accessed by the debugging account under a scenario that the system operates normally. It may be realized by setting a scenario access control linked list. When the system is operating in a debugging mode scenario, the debugging account is allowed to access important system resources, to capture system data and solve the positioning problem conveniently.

A second example: The service system may be classified into a foreground operation scenario and a background operation scenario. By the scenario access control linked list, a scenario may be operated in the foreground, and a program in the service system may access the window or command line interface used for foreground display. When switching to the background running scenario, the foreground resources for example the window or command line interface used for display will be automatically inaccessible to a program in the service system.

In practical application, according to requirements, merely the attribute access control linked list may be set, or merely the scene access control linked list may be set, and both the attribute access control linked list and the scene access control linked list may be set at the same time. Taking the mandatory access control as an example, this access control linked list and the corresponding by the access control linked list to determine whether the subject has the permission to access the object are described in detail below.

For a certain important system log file, a rule may be configured to prohibit all processes from accessing this file, so that any access operation of all processes to this file will fail. However, the process of a certain system attribute incapable to access this important system file, which may affect the normal behavior of the system, and further affecting the stability of the system. Consequently, it is necessary to configure a rule to let the process of this system attribute access successfully. If there are a plurality of processes with such system attribute, and if these processes have the same directory structure, a wildcard matching these processes may be added to the configuration rule. However, if the processes of these system attributes are scattered everywhere, the configured discretionary access control rules may not work.

Based on this, in the embodiment shown in FIG. 1, the subject attribute and the object attribute may be added in the implementation process of the mandatory access control mechanism, and the mandatory access control implementation program may dynamically obtain the subject attribute and the object attribute. After the subject and object rules are successfully matched, when the associated attribute rule (that is the attribute access control linked list) exists under the corresponding rule, the attribute rule may be matched, and in the present embodiment, all processes with the subject process attribute of "SYSTEM" may be set to be allowed to access the object system log file.

However, in this way another problem exists. All processes with non-"SYSTEM" attribute incapable to access this important system log file under any conditions. If the current service system develops a log forwarding program (assuming the program name is LogSend), and the log file of this object system is sent to a backup server, and the current log file of this object system is deleted at the same time, the operation of this log forwarding program may fail. In this point, the fine granularity control ability of the mandatory access control mechanism may be continuously enhanced by re-associating the scenario rule (that is, the scenario access control linked list) under the subject rule and the object rule. Assuming that the log forwarding program generally operates when the system is idle (for example, 2:00 to 3:00 in the morning), a time scenario rule may be associated to allow the LogSend program to access the log file of this object system from 2:00 to 3:00 in the morning, and then the LogSend program may be started to forward and delete the system log file within 2:00 to 3:00 in the morning by means of the schedule task.

S104, when the second result is obtained, by using the second result, performing control processing on the access request.

When a second result exists, it indicates that an access control linked list matching the access request that distinguishing from the security access strategy exists, and based on this access control linked list, the judgment result of whether the subject has the permission to access the corresponding object may be obtained.

When the second result exists, the access request is preferentially controlled by using the second result. That is, regardless of the first result, as long as the second result indicates that the subject has the permission to access the object, the subject is allowed to access the object. Otherwise, the subject is prohibited from accessing the object.

In some embodiments, the step of S104 may further include: in response to obtaining the second result, by using the second result, controlling the access request.

S105, When the second result is not obtained, by using the first result, performing control processing on the access request.

When the second result dose no exist, it is indicated that the access control linked list matching the access request that distinguishing from the security access strategy does not exist. In this point, the first result may be directly used for controlling the access request. That is, when the first result indicates that the subject has the permission to access the object, the subject is allowed to access the object. Otherwise, the subject is prohibited from accessing the object.

In some embodiments, the step of S105 may further include: in response to that the second result is not obtained, controlling the access request by using the first result.

In some embodiments, since in the actual application process, the requirements of a user may change, consequently, the method for controlling the access may further include: viewing, modifying and updating the process strategy for the access control linked list.

The implementation process of viewing includes:

Step 1, receiving a viewing request of the access control linked list.

Step 2, outputting the access control linked list.

A standardized user interface (for example a command line or a UI interface) may be provided to the external, so that viewing of a user may be facilitated, and an access control linked list may be further manually modified.

Wherein, the implementation process of modifying and updating includes:

Step 1, receiving a modification request of the access control list to obtain modification content.

Step 2, by using the modification content, modifying the access control linked list.

For example, when the mandatory access control strategy is adopted, in response to the requirements change, a access control rule update module first modifies the persistent storage (a database or a configuration file) of the mandatory access control rule, and notifying to refresh the memory thereafter. The mandatory access control implementation program refreshes the internal access control linked list (including the embedded attribute access control linked list and scenario access control list).

By using the embodiment of the present application, receiving and parsing the access request, and determining the subject and the object corresponding to the access request. By using the security access strategy, obtaining the first result whether the subject has the permission to access the object, and determining whether the match access control linked list exists. When the access control linked list exists, by using the access control linked list, obtaining the second result whether the subject has the permission to access the object. When the second result is obtained, by using the second result, performing control processing on the access request, or when the second result is not obtained, by using the first result, performing control processing on the access request.

After receiving the access request, the subject and the object corresponding to the access are first determined. Subsequently, by using the security access strategy, determining whether the subject has the permission to access the first result corresponding to the object. At the same time, it is further clarified whether a match access control linked list exist. When an access control linked list exists, based on the access control linked list, determining again whether the subject has the permission to access the second result corresponding to the object. When the second result exists, the second result is preferentially used to control the access request. That is, based on the security access strategy, the access control linked list may be added according to the actual control requirements, to determine whether the subject has the permission to access the object. With the help of the access control linked list, the flexibility and security of the security access strategy may be improved.

Figure 6:
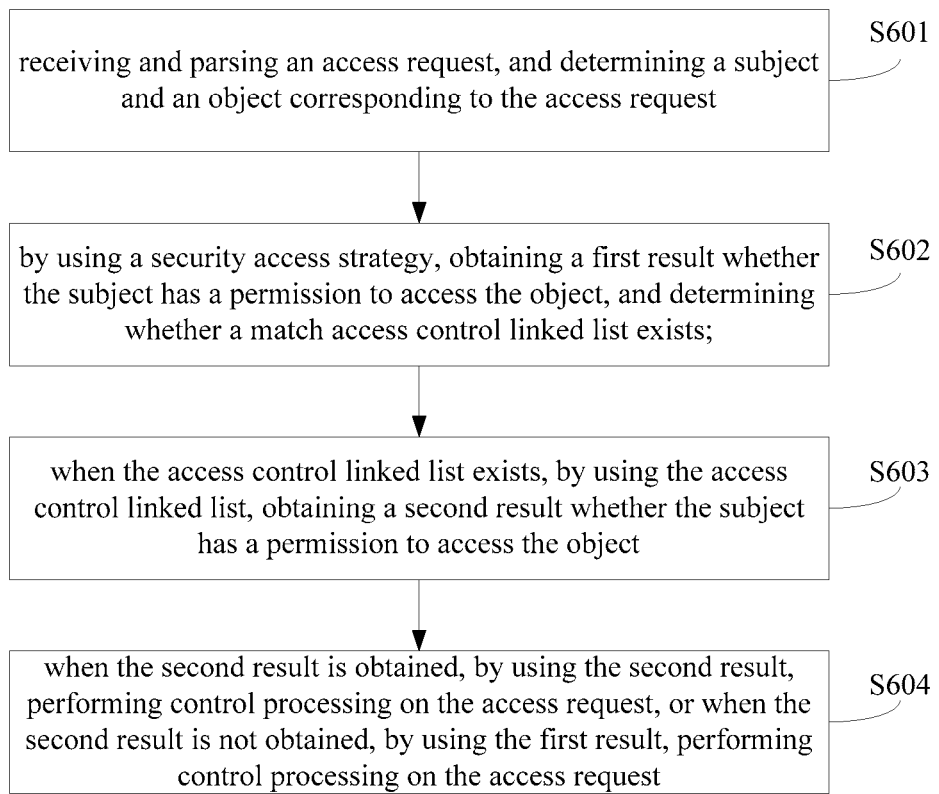
FIG. 6 is another implementation flow chart of the access control method according to one or more embodiments.

In some embodiments, the steps of the method for controlling the access are shown in FIG. 6, and the method for controlling the access includes steps S601, S602, S603 and S604. The contents of every step are as follows:

S601, receiving and parsing an access request, and determining a subject and an object corresponding to the access request.

S602, by using a security access strategy, obtaining a first result whether the subject has a permission to access the object, and determining whether a match access control linked list exists.

S603, when the access control linked list exists, by using the access control linked list, obtaining a second result whether the subject has a permission to access the object.

S604, when the second result is obtained, by using the second result, performing control processing on the access request, or when the second result is not obtained, by using the first result, performing control processing on the access request.

Figure 2:
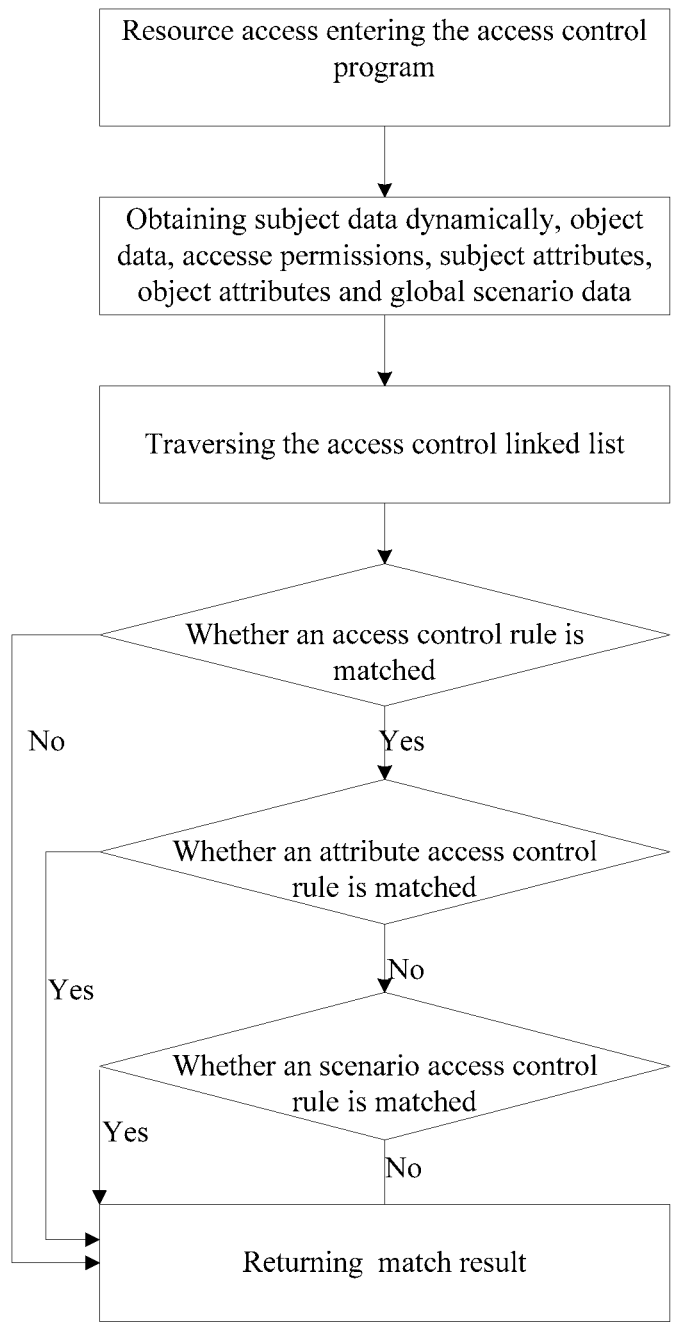
FIG. 2 is a implementation schematic diagram of the access control method according to one or more embodiments.

In some embodiments, by implementing the method for controlling the access, by the access control linked list, the access control rule may be configured under various complex situations by means of the access control linked list, and the fine granularity access control permission may be set flexibly and conveniently, so that the security of resources on various systems is protected. Taking the mandatory access control strategy as an example and referring to FIG. 2, the implementation of how to use the access control linked list to enhance the mandatory access control strategy is described in detail below.

The following modules may be provided:

An enhanced persistent storage module of the mandatory access control rule: that is, the mandatory access control rule data added with the attribute access control rule and the scenario access control rule is stored in a database or a configuration file (for example a XML file) in a structured way.

An enhanced initialization module of the mandatory access control system: when the mandatory access control implementation program is initialized, reading the mandatory access control rules (including the attribute access control rule and the scenario access control rule) stored in the database or the configuration file, and caching them in the access control linked list inside the program.

An enhanced match module of the mandatory access control system rule: when the mandatory access control implementation program intercepts resource access, traversing the access control rule linked list (including the embedded attribute access control linked list and scenario access control linked list) to obtain whether this action has a permission to be executed.

An enhanced update module of the mandatory access control system rule: when the mandatory access control rules need to be changed, the access control rule update module first modifies the persistent storage (a database or a configuration file) of the mandatory access control rule, and notifying to refresh the memory. The mandatory access control implementation program refreshes the internal access control linked list (including the embedded attribute access control linked list and scenario access control linked list).

A viewing and update module of the access control rule: providing a standardized user interface (a command line or a UI interface), which may conveniently view or manually modify the mandatory access control rules (including the attribute access control rule and the scenario access control rule).

That is, by adding the attribute access control linked list and the scenario access control linked list to a general mandatory access control model, the attribute access control linked list and the scenario access control linked list are embedded in the subject rule and the object rule access control linked list of the general mandatory access control model. When the system intercepts a particular access control action of the subject to the object, first matching with the linked list of the general mandatory access control rule. When a particular rule is matched, the program judges whether an attribute access control linked list or a scenario access control linked list is attached under this particular rule. When this rule does not have the attached attribute access control linked list or scenario access control linked list, it will be returned according to the match result of the general access control linked list. If the attribute access control linked list or the scenario access control linked list is embedded under this specific rule, the match of the attribute access control linked list and the scenario access control linked list will be carried out subsequently. If either of them is matched successful, it will be returned according to the corresponding match result, otherwise, it will be returned according to the result of the general mandatory access control rule.

Corresponding to the above embodiment of the method for controlling the access, an embodiment of the present application further provides a access control device, and the device for controlling the access described below and the method for controlling the access described above may be referenced correspondingly.

Figure 3:
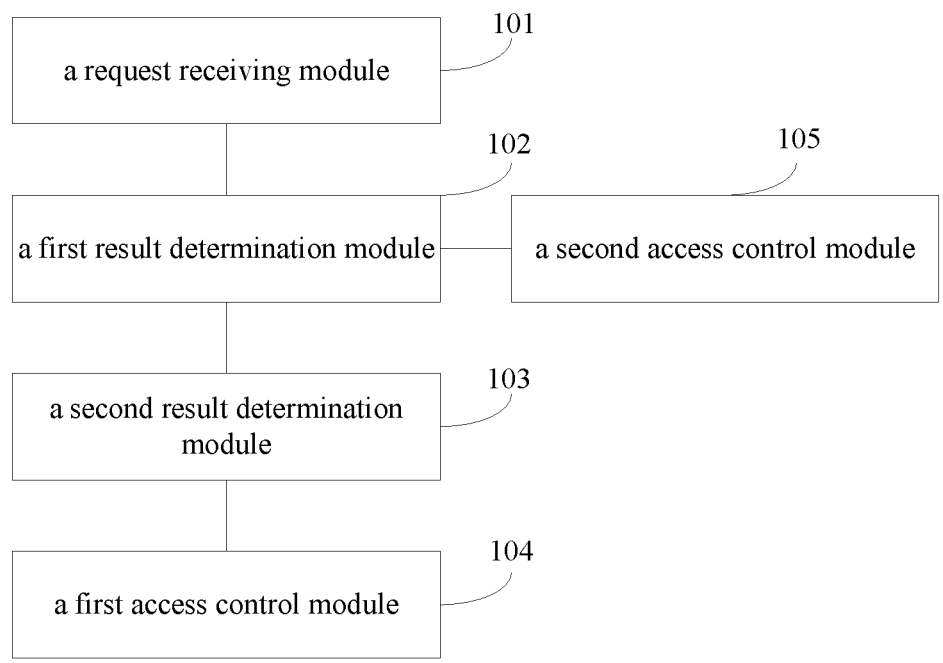
FIG. 3 is a structural schematic diagram of the access control device according to one or more embodiments.

Referring to FIG. 3, this device includes the following modules:

a request receiving module 101, configured for receiving and parsing an access request, and determining a subject and an object corresponding to the access request;

a first result determination module 102, configured for by using a security access strategy, obtaining a first result whether the subject has a permission to access the object, and determining whether a match access control linked list exists;

a second result determination 103, configured for when the access control linked list exists, by using the access control linked list, obtaining a second result whether the subject has a permission to access the object;

a first access control module 104, configured for when the second result is obtained, by using the second result, performing control processing on the access request; and a second access control module 105, configured for when the second result is not obtained, by using the first result, performing control processing on the access request.

In some embodiments, the second result determination module 103 may be configured for, in response to the existence of the access control linked list, obtaining a second result of whether the subject has a permission to access the object by using the access control linked list. In response to the second result being obtained, the first access control module 104 may be configured for performing control processing on the access request by using the second result. In response to the second result not being obtained, the second access control module 105 may be configured for performing control processing on the access request by using the first result.

By using the device provided by the embodiment of the present application, receiving and parsing an access request, and determining a subject and an object corresponding to the access request; by using a security access strategy, obtaining a first result whether the subject has a permission to access the object, and determining whether a match access control linked list exists; when the access control linked list exists, by using the access control linked list, obtaining a second result whether the subject has a permission to access the object; and when the second result is obtained, by using the second result, performing control processing on the access request, or when the second result is not obtained, by using the first result, performing control processing on the access request.

After receiving the access request, the subject and object corresponding to the access are first determined. Subsequently, by using the security access strategy, determining whether the subject has the permission to access the first result corresponding to the object. At the same time, it is further clarified whether a match access control linked list exists. When the access control linked list exists, based on the access control linked list, determining again whether the subject has the permission to access the second result corresponding to the object. When a second result exists, the second result is preferentially used for controlling the access request. That is, based on the security access strategy, the access control linked list may be added according to the actual control requirements to determine whether the subject has the permission to access the object. With the help of the access control linked list, the flexibility and security of the security access strategy may be improved.

In some embodiments, when the access control linked list is an attribute access control linked list, the second result determination module 103 is configured for obtaining an attribute of the subject and the object, and querying the second result matching the attribute from the attribute access control linked list.

In some embodiments, when the access control linked list is a scenario access control linked list, the second result determination module 103 is configured for acquiring scenario information corresponding to the access request; and querying the second result matching the scenario information from the scenario access control linked list.

In some embodiments, the device for controlling the access further includes a modification and update module, configured for receiving a modification request of the access control list to obtain modification content; and by using the modification content, modifying the access control linked list.

In some embodiments, the device for controlling the access further includes a viewing module, configured for receiving a viewing request of the access control linked list; and outputting the access control linked list.

In some embodiments, when the security access strategy is a discretionary access strategy, the first result determination module 102 is configured for obtaining an authorization list corresponding to the object; and searching the subject in the authorization list to obtain the first result whether the subject has a permission to access the object.

In some embodiments, when the security access strategy is a mandatory access strategy, the first result determination module 102 is configured for obtaining a security tag of the subject and a security tag of the object; and comparing the security tag of the subject with the security tag of the object to obtain the first result whether the subject has the permission to access the object.

Corresponding to the above embodiment of the method for controlling the access, the embodiment of the present application further provides an electronic device, and the electronic device described below and method for controlling the access described above may be referenced correspondingly.

Figure 4:
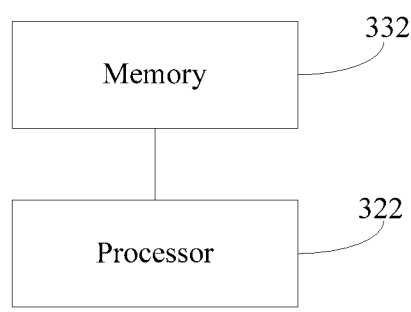
FIG. 4 is a structural schematic diagram of the electronic device according to one or more embodiments.

Referring to FIG. 4, the electronic device includes:

a memory 332, configured for storing computer-readable instructions;

a processor 322, configured for implementing the step of the method according to any one of the above-mentioned embodiments when executing the computer-readable instruction.

Figure 5:
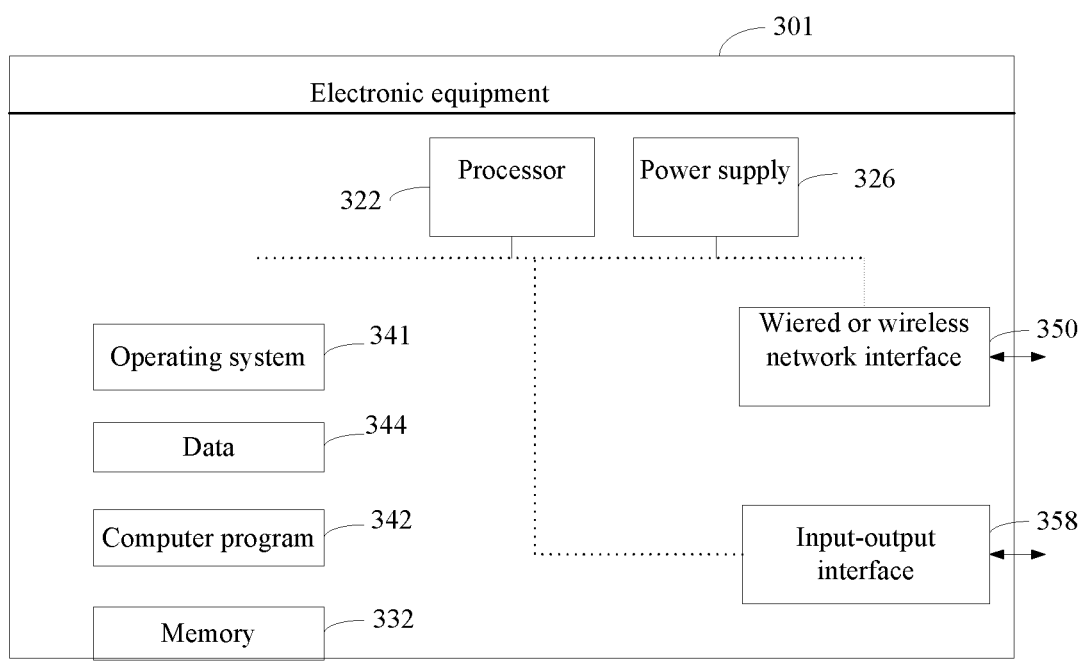
FIG. 5 is a structural schematic diagram of the electronic device according to one or more embodiments.

Please refer to FIG. 5, which is a structural schematic diagram of the electronic device provided by an embodiment of the present embodiment. This electronic device may have a relatively large difference due to different configurations or performances, and may include one or more central processing units (CPU) 322 (for example, one or more processors) and a memory 332.

The memory 332 may store one or more computer applications 342 or data 344. Wherein, the memory 332 may be a temporary storage or a permanent storage. The program stored in the memory 332 may include one or more modules (not shown), and every module may include a series of instruction operations in the data processing device. Further, the central processor 322 may be configured to communicate with the memory 332, and execute a series of instruction operations in the memory 332 on the electronic device 301.

The electronic device 301 may further include one or more power supplies 326, one or more wired or wireless network interfaces 350, one or more input and output interfaces 358, and/or one or more operation systems 341.

The steps in the method for controlling the access described above may be realized by the structure of an electronic apparatus.

Corresponding to the above embodiment of the method for controlling the access, an embodiment of the present application further provides a non-transitory computer-readable storage medium, and the non-transitory computer-readable storage medium described below and the method for controlling the access described above may be referenced correspondingly.

One or more non-transitory computer-readable storage media storing computer-readable instructions, wherein when the computer-readable instruction is executed by one or more processors, making the one or more processors perform the step of the method according to any one of the above-mentioned embodiments.

The non-transitory computer-readable storage medium may be a USB flash drive, a mobile hard disk, a Read-Only Memory (ROM), a Random Access Memory (RAM), a magnetic disk or an optical disk, and other readable storage media that may store program codes.

A person skilled in the art may further realize that the units and algorithm steps of each of the examples described in combination with the embodiments disclosed herein may be realized by an electronic hardware, a computer software or a combination of the two. In order to clearly illustrate the interchangeability of the hardware and the software, the components and steps of each of the examples have been generally described according to functions in the above-mentioned description. Whether these functions are implemented in hardware or software depends on the particular application and design constraints of the technical solution. A person skilled in the art may use different methods to implement the described functions for every particular application, but this implementation should not be considered that the implementation goes beyond the scope of the present application.

The invention claimed is:

1. An electronic device, comprising:
   a processor; and
   a memory, configured for storing computer-readable instructions, wherein the computer-readable instructions, when executed by the processor, cause the processor to perform operations of:
   receiving and parsing an access request, and determining a subject and an object corresponding to the access request;
   by using a security access strategy, obtaining a first result whether the subject has a permission to access the object, and determining whether a match access control linked list exists;
   when the access control linked list exists, by using the access control linked list, obtaining a second result whether the subject has a permission to access the object; and
   when the second result is obtained, by using the second result, performing control processing on the access request, or when the second result is not obtained, by using the first result, performing control processing on the access request.

2. The electronic device according to claim 1, wherein when the access control linked list is an attribute access control linked list, the step of, by using the access control linked list, obtaining the second result whether the subject has the permission to access the object, comprising:
   obtaining an attribute of the subject and the object; and
   querying the second result matching the attribute from the attribute access control linked list.

3. The electronic device according to claim 1, wherein when the access control linked list is a scenario access control linked list, the step of, by using the access control linked list, obtaining the second result whether the subject has the permission to access the object, comprising:
   acquiring scenario information corresponding to the access request; and
   querying the second result matching the scenario information from the scenario access control linked list.

4. The electronic device according to claim 1, wherein the processor is further configured to perform operations of:
   receiving a modification request of the access control linked list to obtain modification content; and
   by using the modification content, modifying the access control linked list.

5. The electronic device according to claim 1, wherein the processor is further configured to perform operations of:
   receiving a viewing request of the access control linked list; and
   outputting the access control linked list.

6. The electronic device according to claim 1, wherein when the security access strategy is a discretionary access strategy, the step of, by using the security access strategy, obtaining the first result whether the subject has the permission to access the object, comprising:
   obtaining an authorization list corresponding to the object; and
   searching the subject in the authorization list to obtain the first result whether the subject has the permission to access the object.

7. The electronic device according to claim 1, wherein when the security access strategy is a mandatory access strategy, the step of, by using the security access strategy, obtaining a first result whether the subject has the permission to access the object, comprises:
   obtaining a security tag of the subject and a security tag of the object; and
   comparing the security tag of the subject with the security tag of the object to obtain the first result whether the subject has the permission to access the object.

8. The electronic device according to claim 7, wherein the security tag of the subject is a security level label tag having a partial order relationship.

9. The access control method according to claim 7, wherein the security tag of the object is a non-level classification tag.

10. The electronic device according to claim 7, wherein the attributes of the subject are the features of the subject, and the attributes of the object are the features of the object.

11. The electronic device according to claim 1, wherein the subject is a process or a thread.

12. The electronic device according to claim 1, wherein the object may be a file, a directory, a Transmission Control Protocol (TCP)/User Datagram Protocol (UDP) port, a shared memory segment, an input/output (I/O) device, a table, a view or a process.

13. A non-transitory computer-readable storage medium storing computer-readable instructions, wherein when the computer-readable instruction is executed by one or more processors, making the one or more processors perform operations of:
   receiving and parsing an access request, and determining a subject and an object corresponding to the access request;
   by using a security access strategy, obtaining a first result whether the subject has a permission to access the object, and determining whether a match access control linked list exists;
   when the access control linked list exists, by using the access control linked list, obtaining a second result whether the subject has a permission to access the object; and when the second result is obtained, by using the second result, performing control processing on the access request, or when the second result is not obtained, by using the first result, performing control processing on the access request.

\* \* \* \* \*